Feb. 13, 1923.
J. W. PEARSON.
CONNECTING ROD.
FILED OCT. 28, 1920.
1,444,883.
2 SHEETS—SHEET 1.

INVENTOR
John W. Pearson,
Toulmin & Toulmin
ATTORNEYS

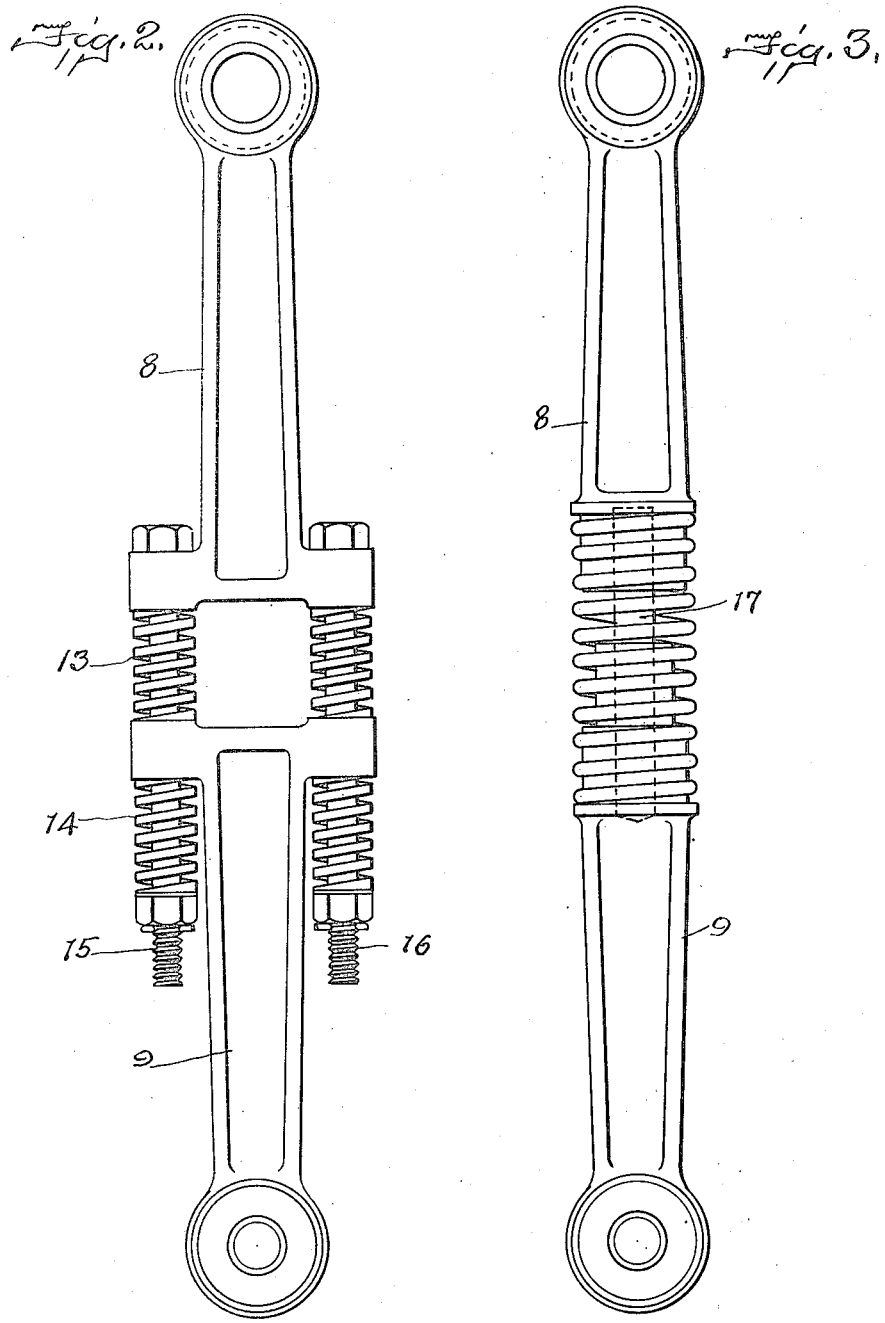

Patented Feb. 13, 1923.

1,444,883

UNITED STATES PATENT OFFICE.

JOHN W. PEARSON, OF DAYTON, OHIO, ASSIGNOR TO THE DAVIS SEWING MACHINE COMPANY, OF DAYTON, OHIO, A CORPORATION OF DELAWARE.

CONNECTING ROD.

Application filed October 28, 1920. Serial No. 420,113.

*To all whom it may concern:*

Be it known that I, JOHN W. PEARSON, a citizen of the United States, residing at Dayton, in the county of Montgomery and State of Ohio, have invented certain new and useful Improvements in Connecting Rods, of which the following is a specification reference being had therein to the accompanying drawing.

My invention relates to connecting rods and in particular to connecting rods used with mechanism subjected to heavy alternate stresses and strains set up during the movement of reciprocating parts.

I have shown my invention embodied in connection with a washing machine for the purposes of illustration only and do not intend to confine myself to this application alone.

The object of my invention is to provide a connecting rod which will absorb within itself torsional, longitudinal and lateral strains and the shock set up in such connecting rod and its bearings in order to relieve the bearings of undue stress and strain. It is a further object of my invention to provide a self alining connecting rod which shall automatically compensate for any irregularties in position of the respective bearings with respect to one another and to the connecting rod, thus preventing wear and strain upon the bearings and permitting of the use in some instances of such material as wood instead of metal, thereby greatly economizing in the cost of manufacture of many articles in which such a connecting rod is employed.

It is a further object of my invention to take up the stresses and strains, shocks and vibrations incident to the operations of some classes of machinery quickly and readily in the connecting rod to avoid having a rigid connection between the bearings, which would cause the shock to pass around through the mechanism rather than have all the stresses and strains and the power directly and positively transmitted on a line of draft passing through the connecting rod, as in my present invention.

In the accompanying drawings:—

Fig. 2 is a preferred form of my connecting rod; and

Fig. 3 illustrates another form of my connecting rod.

Figure 1:
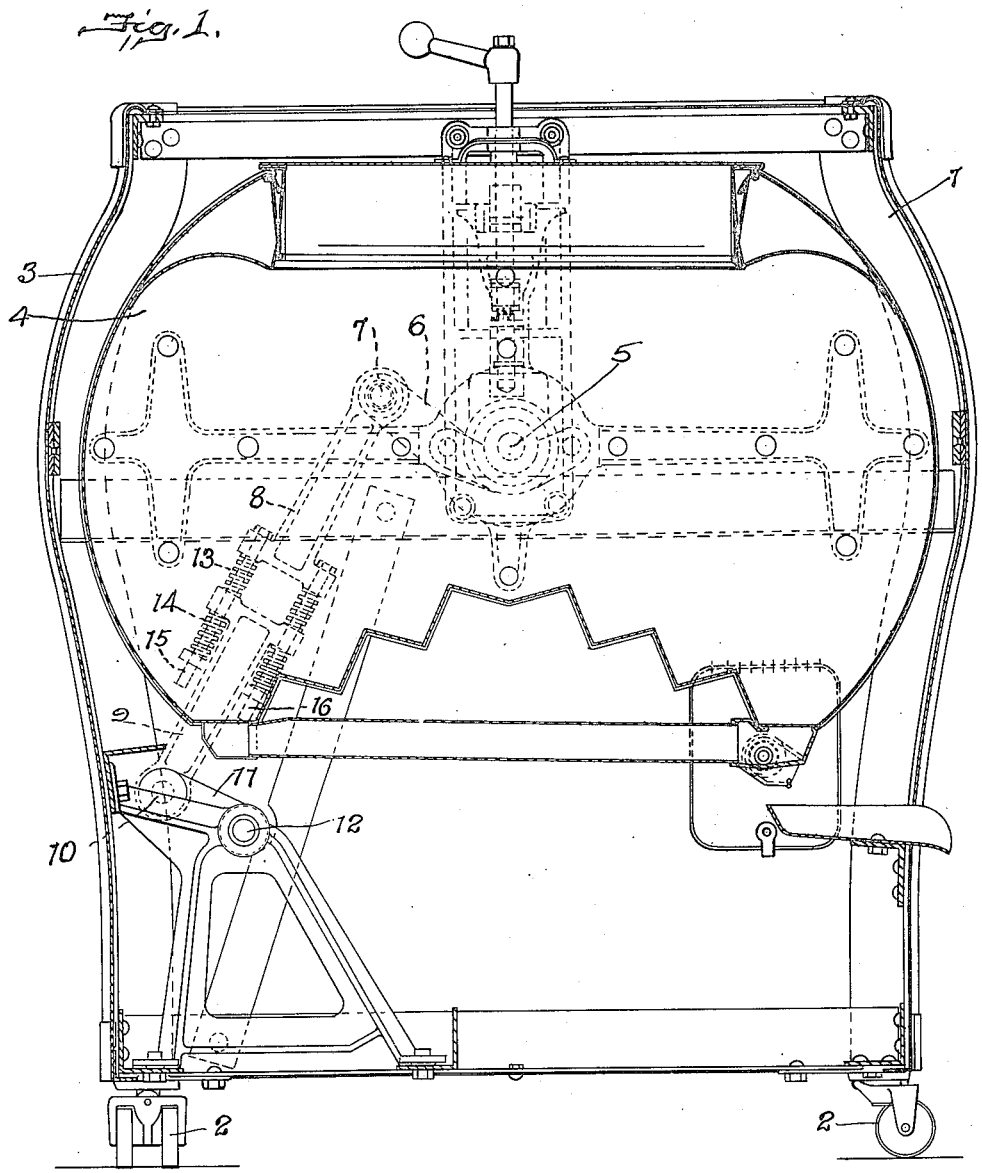
Fig. 1 is a washing machine in which my connecting rod is embodied.

Referring to Fig. 1, in order to illustrate the adaptation of my connecting rod in a practical application there will be found a washing machine with a frame 1 resting upon rollers or casters 2. This frame is incased in walls 3. Within the casing is mounted a receptacle containing the clothes and water, as at 4, which is rocked back and forth about the axis 5 having suitable resilient restraining means, not shown, to limit the rocking about the axis 5. It will be observed that the liquid within the receptacle as well as the clothes, is hurled back and forth in the receptacle which comes to the end of its movement suddenly, thus setting up a heavy shock and strain in the mechanism. The receptacle 4 is reciprocated through the arm 6 joined at 7 to one element 8 of the connecting rod. The other element 9 of the connecting rod is joined at 10 to an operating crank 11 driven from a power shaft 12 which is connected to any suitable source of power, usually an electric motor. The two elements 8 and 9 are connected to one another through the springs 13 and 14, through which pass guiding rods 15 and 16.

As the washing machine operates, when it comes to the end of its stroke one pair of springs will be compressed and when it comes to the other end of its stroke the other pair of springs will be compressed. It will also be found that in such classes of mechanism there will be a failure of the respective parts to properly aline themselves. My connecting rod permits of a torsional movement about its major axis, thus insuring a proper relative position of each of its respective elements with respect to the bearing to which each element it attached.

Referring to Fig. 3 I have shown another embodiment of my invention or a modification thereof consisting of the two elements with a single spring member embracing the end of each one and having a telescopic guiding pin 17.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

In a connecting rod the combination with a plurality of elements each with a bearing at one end and an integral T-head at the other the latter having apertures on each side of the T-head elements and the T-heads of said elements being adjacent and oppositely disposed one to another, guide rods in said apertures parallel to the major axis of said elements, resilient means connecting said elements to permit of lateral, longitudinal and torsional movement and to absorb shock between said elements and upon their bearings and to maintain said elements in alignment, said resilient means being located on both the upper and lower sides of the T-head.

In testimony whereof, I affix my signature.

JOHN W. PEARSON.